US010523486B2

United States Patent
Xin et al.

(10) Patent No.: US 10,523,486 B2
(45) Date of Patent: Dec. 31, 2019

(54) DATA MODULATION AND DEMODULATION METHOD AND DATA TRANSMISSION METHOD AND NODE FOR MULTI-CARRIER SYSTEM

(71) Applicant: ZTE CORPORATION, Guangdong (CN)

(72) Inventors: Yu Xin, Guangdong (CN); Guanghui Yu, Guangdong (CN); Jun Xu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/069,033

(22) PCT Filed: Feb. 7, 2017

(86) PCT No.: PCT/CN2017/073047
§ 371 (c)(1),
(2) Date: Jul. 10, 2018

(87) PCT Pub. No.: WO2017/121410
PCT Pub. Date: Jul. 20, 2017

(65) Prior Publication Data
US 2019/0028312 A1    Jan. 24, 2019

(30) Foreign Application Priority Data
Jan. 11, 2016   (CN) .......................... 2016 1 0015419

(51) Int. Cl.
*H04L 5/00*    (2006.01)
*H04L 27/26*   (2006.01)
(Continued)

(52) U.S. Cl.
CPC .... *H04L 27/2628* (2013.01); *H04L 25/03834* (2013.01); *H04L 27/00* (2013.01);
(Continued)

(58) Field of Classification Search
USPC .......................... 375/261, 246, 301; 704/203
See application file for complete search history.

(56) References Cited

U.S. PATENT DOCUMENTS 4,715,046 A * 12/1987 True, III ............ H04B 17/0085
375/301
7,317,750 B2 * 1/2008 Shattil ............... H04L 25/03834
375/146

(Continued)

*Primary Examiner* — Eva Y Puente
(74) *Attorney, Agent, or Firm* — Nath, Goldberg & Meyer; Joshua B. Goldberg (57) ABSTRACT

Disclosed in the embodiments of the present application are a data modulating and demodulating method, a data transmission method and node for multi-carrier system. The data modulating method including: selecting, by a transmitting node, corresponding waveform functions based on values of a first parameter, wherein the first parameter includes K values corresponding to K different waveform functions, respectively, and K is an integer greater than 1; and performing, by the transmitting node, using the selected waveform functions, modulation on time domain data sequences processed by Inverse Fast Fourier Transform (IFFT) to obtain a modulated data sequence. The first parameter may be configured by a base station for a UE. Also provided by the embodiments of the present application are a corresponding demodulation method and data transmission method and node.

20 Claims, 3 Drawing Sheets

---

┌─ 110 selecting corresponding waveform functions based on values of a first parameter, wherein the first parameter includes K values corresponding to K different waveform functions, respectively, and K is an integer greater than 1

┌─ 120 performing, using the selected waveform functions, modulation on time domain data sequences processed by Inverse Fast Fourier Transform (IFFT) to obtain a modulated data sequence (51) Int. Cl.
*H04L 27/00* (2006.01)
*H04L 25/03* (2006.01)

(52) U.S. Cl.
CPC ........ *H04L 27/264* (2013.01); *H04L 27/2631* (2013.01); *H04L 27/2649* (2013.01); *H04L 5/0048* (2013.01)

(56) References Cited

U.S. PATENT DOCUMENTS

| | | | |
|---|---|---|---|
| 7,986,740 B2 * | 7/2011 | Bank | H04L 5/0016 370/206 |
| 2005/0203730 A1 * | 9/2005 | Aoki | G01S 7/2813 704/203 |
| 2007/0016405 A1 * | 1/2007 | Mehrotra | G10L 19/0212 704/203 |
| 2018/0115787 A1 * | 4/2018 | Koo | H04N 19/124 |

* cited by examiner

FIG. 10

DATA MODULATION AND DEMODULATION METHOD AND DATA TRANSMISSION METHOD AND NODE FOR MULTI-CARRIER SYSTEM

This is a National Phase Application filed under 35 U.S.C. 371 as a national stage of PCT/CN2017/073047, filed Feb. 7, 2017, an application claiming the benefit of Chinese Application No. 201610015419.3, filed Jan. 11, 2016, the content of each of which is hereby incorporated by reference in its entirety.

TECHNICAL FIELD

The embodiments of the present disclosure relate to but are not limited to the field of communication, and in particular to a data modulation and demodulation method, a data transmission method, and a node for multi-carrier system.

BACKGROUND

Long Term Evolution (LTE) is a Fourth Generation (4G) wireless cellular communication technology. LTE adopts Orthogonal Frequency Division Multiplexing (OFDM) technology, and time-frequency resources composed of subcarriers and OFDM symbols form the wireless physical time frequency resources of LTE systems. Currently, OFDM technology has been widely applied in wireless communication. Due to the use of cyclic prefix (CP), CP-OFDM systems can solve the problem of multipath delay well and divide the frequency selective channel into a set of flat channels in parallel, which simplifies the method for channel estimation with a high accuracy. However, the performance of CP-OFDM systems is sensitive to frequency offset and time offset between adjacent sub-bands. This is mainly because the systems have a high spectral leakage, which is likely to cause interference between sub-bands. Currently, guard intervals are adopted in the frequency domain for LTE systems, but this practice leads to reduced spectral efficiency. Thus new techniques are needed to suppress out-of-band leakage.

Now companies are beginning to conduct research on 5G (fifth generation) wireless communication technology, in which suppression of out-of-band leakage is an important direction. Recently, new multi-carrier schemes, such as Filter Bank Multicarrier (FBMC) and Generalized Frequency Division Multiplexing (GFDM), introduced in some literature can suppress out-of-band leakage, but cannot meet the needs of different scenarios. In addition, there are compatibility problems with the OFDM technology of LTE, channel estimation problems, and problems of combining with Multiple Input Multiple Output (MIMO) technology. Although filtered OFDM (F-OFDM) and Universal Filtered Multi-Carrier (UFMC) mentioned in other literature are compatible with LTE, they have poor performance on suppression of out-of-band leakage, and need strict synchronization between sub-carriers within a bandwidth. That is, F-OFDM and UFMC are sensitive to frequency offset and time offset in the sub-band, and are degraded in the demodulation performance at the receiving end.

Therefore, it is necessary to propose a method to adapt to the needs of different scenarios. In addition, it is expected that compatibility with the LTE system to be maintained as much as possible, and the demodulation performance of the receiving end to be improved.

SUMMARY

The following is a summary of the topics described in detail herein. This summary is not intended to limit the scope of the claims.

The following technical solutions are provided in embodiments of the present disclosure.

A data modulating method for a multi-carrier system, applied to a transmitting node, including: selecting corresponding waveform functions based on values of a first parameter, wherein the first parameter includes K values corresponding to K different waveform functions, respectively, and K is an integer greater than 1; and performing, using the selected waveform functions, modulation on time domain data sequences processed by Inverse Fast Fourier Transform (IFFT) to obtain a modulated data sequence.

A transmitting node of a multi-carrier system, the transmitting node includes a data modulating device, wherein the data modulating device comprising: a function selecting module 10 configured to select corresponding waveform functions based on values of a first parameter, wherein the first parameter includes K values corresponding to K different waveform functions, respectively, and K is an integer greater than 1; a modulation processing module 20 configured to perform, using the selected waveform functions, modulation on time domain data sequences processed by Inverse Fast Fourier Transform (IFFT) to obtain a modulated data sequence; and a function storing module 30 configured to store K different waveform functions corresponding to the K values, respectively.

A data demodulating method for a multi-carrier system, applied to a receiving node, comprising: receiving modulated data transmitted by a transmitting node, wherein the transmitting node selects corresponding waveform functions based on values of a first parameter and performs modulation on time domain data sequences processed by Inverse Fast Fourier Transform (IFFT) according to any one of the data demodulation methods of the present application; and selecting corresponding waveform functions based on values of the first parameter to perform demodulation on the received data.

A receiving node of a multi-carrier system, the receiving node includes a data demodulating device, wherein the data demodulating device comprising: a data receiving module 40 configured to receive modulated data transmitted by a transmitting node, wherein the transmitting node selects corresponding waveform functions based on values of a first parameter and performs modulation on time domain data sequences processed by Inverse Fast Fourier Transform (IFFT) according to any one of the data demodulation methods of present application; and a demodulation processing module 50 configured to select corresponding waveform functions based on values of the first parameter to perform demodulation on the received data.

A data modulating method for a multi-carrier system, applied to an uplink data transmitting node, comprising: receiving a message transmitted by a downlink data transmitting node, wherein the message carries values of a first parameter specified for the uplink data transmitting node; and performing modulation on uplink data according to any one of the data modulating methods of the present application, wherein waveform functions used in the modulation are selected according to values of the specified first parameter.

An uplink data transmitting node of a multi-carrier system, the uplink data transmitting node includes an information receiving device 60 and a data modulating device 70, wherein the information receiving device 60 is configured to receive a message transmitted by a downlink data transmitting node, wherein the message carries values of a first parameter specified for the uplink data transmitting node; and the data modulating device 70 is configured to perform modulation on uplink data according to any one of the data modulating methods of the present application, wherein waveform functions used in the modulation are selected according to values of the specified first parameter.

A data demodulating method for a multi-carrier system, applied to an uplink data receiving node, comprising: transmitting, by the uplink data receiving node, a message to an uplink data transmitting node, wherein the message carries values of a first parameter specified for the uplink data transmitting node, and the values of the first parameter are used for waveform function selection during modulation of uplink data; and receiving, by the uplink data receiving node, modulated uplink data transmitted by the uplink data transmitting node, selecting corresponding waveform functions according to the values of the first parameter, and demodulating the received uplink data by using the selected waveform functions; wherein the first parameter includes K values corresponding to K different waveform functions, respectively, and K is an integer greater than 1.

An uplink data receiving node of a multi-carrier system, the uplink data receiving node includes an information transmitting device 80 and a data demodulating device 90, wherein the information transmitting device 80 is configured to transmit a message to an uplink data transmitting node, wherein the message carries values of a first parameter specified for the uplink data transmitting node, and the values of the first parameter are used for waveform function selection during modulation of uplink data; and the data demodulating device 90 is configured to receive modulated uplink data transmitted by the uplink data transmitting node, select corresponding waveform functions according to the values of the first parameter, and demodulate the received uplink data by using the selected waveform functions; wherein the first parameter includes K values corresponding to K different waveform functions, respectively, and K is an integer greater than 1.

A data transmission method for a multi-carrier system, comprising: specifying, by an uplink data receiving node, values of a first parameter for an uplink data transmitting node, wherein the values of the first parameter is used for waveform function selection during modulation of uplink data; and carrying, by the uplink data receiving node, the specified values of the first parameter in a message and transmitting to the uplink data transmitting node; wherein the first parameter includes K values corresponding to K different waveform functions, respectively, and K is an integer greater than 1.

An uplink data receiving node of a multi-carrier system, the uplink data receiving node includes a data transmitting device, wherein the data transmitting device comprising: a parameter specifying module 101 configured to specify values of a first parameter for an uplink data transmitting node, wherein the values of the first parameter is used for waveform function selection during modulation of uplink data; and a parameter transmitting module 103 configured to carry the specified values of the first parameter in a message and transmitting to the uplink data transmitting node; wherein the first parameter includes K values corresponding to K different waveform functions, respectively, and K is an integer greater than 1.

A computer readable storage medium storing computer executable instructions for performing the above methods is also provided in an embodiment of the present application.

The above solutions propose methods for modulating and demodulating data by flexibly selected suitable waveform functions, and corresponding data transmission methods and nodes, which enable adaption to requirements of different scenarios by selecting or configuring different parameters, and demodulating using corresponding waveforms. In addition, good compatibility with LTE can also be realized and better demodulation performance may be achieved at the receiving end.

Other aspects can be understood after reading and understanding the drawings and detailed description.

DETAILED DESCRIPTION

In the following, embodiments of the disclosure will be described in detain with reference to the drawings. It is to be noted that, the features in the application and the embodiments in this application can be combined arbitrarily, as long as no confliction would be caused.

Embodiment 1

As mentioned in the background, there is high out-of-band leakage in the spectrum in an LTE system, and guard interval is required in the frequency domain, so as to reduce the spectrum efficiency. Thus, new technologies are needed to suppress the out-of-band leakage. Recently, new multi-carrier schemes (i.e., FBMC and GFDM technologies) mentioned in some literature can suppress out-of-band leakage, but problems, such as adaptability in scenarios of CP-OFDM technology of LTE and compatibility with LTE, may exist. In order to solve these problems, the present embodiment proposes a method in which data is flexibly modulated by a transmitting node of a multi-carrier system. The transmitting end of the multi-carrier system includes transmitting devices such as a base station, a terminal, a relay, a transmitting node, and the like, and the transmitting devices are collectively referred to as transmitting node herein.

Figure 1:
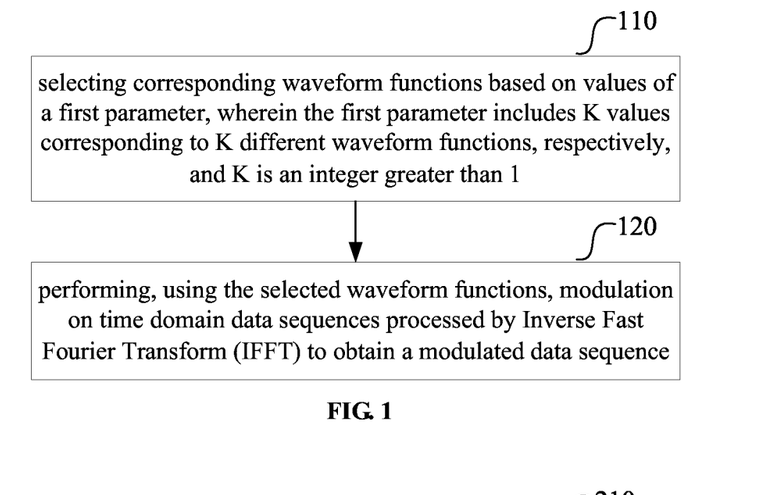
FIG. 1 is a flowchart of a data modulating method according to Embodiment 1 of the present disclosure.

As shown in FIG. 1, the data modulating method for a multi-carrier system according to the present embodiment may be applied to a transmitting node and include the following steps.

At step 110, corresponding waveform functions are selected based on values of a first parameter, wherein the first parameter includes K values corresponding to K different waveform functions, respectively, and K is an integer greater than 1.

In the present embodiment, the K different waveform functions include one or more of the following functions with different parameters: a rectangular function; a raised cosine function; a piecewise function; and a root raised cosine function. The raised cosine function may be a function transformed to the time domain from a raised cosine function in the frequency domain by Inverse Fast Fourier Transform (IFFT), or a raised cosine function in the time domain; so for the root raised cosine function. The piecewise function refers to a function in which a non-zero function value is represented by combining a plurality of mathematical expressions in different independent variable intervals. For example, the piecewise function may be a step function with multiple non-zero constant values. The above K different waveform functions may be functions of different types, or may be a same function with different parameters.

An interval length of independent variables of the K waveform functions may be $N_k \times T$, wherein $N_k$ is a real number greater than or equal to 1, k=1, 2, ..., K, and the modulated data sequence includes data sequences for multiple symbols, wherein T is a predetermined interval between symbols of the modulated data sequence. Wherein a maximum time span between the independent variables corresponding to non-zero values of the K waveform functions may be greater than or equal to T. The maximum time span here is a time span between the independent variables in the independent variable interval corresponding to the two endpoints for the non-zero function values. $N_k$ on different independent variable intervals may be the same or different with each other.

The range of values for the first parameter described above may be prescribed by a standard/protocol, or configured by a corresponding node (the specific values for the first parameter may also be configured by the node when multiple values are prescribed). For example, when the transmitting node is a UE, the values of the first parameter may be configured and transmitted to the UE by the base station.

At step 120, modulation is performed, using the selected waveform functions, on time domain data sequences processed by Inverse Fast Fourier Transform (IFFT) to obtain a modulated data sequence.

In the present embodiment, the modulation is a polyphase filtering process, wherein the polyphase filtering process may be referred to as a polyphase filtering modulation. Since the multi-phase filtering process includes a plurality of filtering processes performed in parallel, the polyphase filtering modulation is also referred to as filter bank (FB) modulation in the present application. The parameters in the polyphase filtering process are determined according to the selected waveform functions.

In the present embodiment, performing, using the selected waveform functions, FB modulation on time domain data sequences processed by IFFT includes: windowing, using the selected waveform functions, the time domain data sequences processed by IFFT, i.e., a time-domain windowing process.

In the present embodiment, performing, using the selected waveform functions, FB modulation on the time domain data sequences processed by IFFT to obtain the modulated data sequence includes: performing, using discrete function values of the selected waveform functions, waveform modulation on a time domain data sequence for each symbol in L consecutive symbols processed by IFFT, and superimposing L waveform modulated data sequences to obtain a modulated data sequence for the L consecutive symbols, wherein L≥2.

Performing, using discrete function values of the selected waveform functions, waveform modulation on a time domain data sequence for each symbol in L consecutive symbols processed by IFFT may include: expanding the time domain data sequence repeatedly for each symbol to obtain a time domain data sequence which has a length of $N \times T$ for each symbol, wherein $N \times T$ is an interval length of independent variables of the selected waveform functions; performing dot multiplication between the discrete function values of the selected waveform functions and the time domain data sequence which has a length of $N \times T$ for each symbol to obtain L waveform modulated data sequences each having a length of $N \times T$; wherein superimposing the L waveform modulated data sequences to obtain a modulated data sequence for the L consecutive symbols may include: shifting each of the waveform modulated data sequences having a length of $N \times T$ by T in the time domain sequentially, and superimposing the shifted data sequences to obtain the modulated data sequence for the L consecutive symbols.

Assuming that the length of the data sequence after waveform modulation for each symbol is 3 T, wherein L=3, in this case, after superimposing the data sequences shifted by T in the time domain sequentially, a modulated data sequence for the 3 consecutive symbols has a length of 5 T.

If the selected waveform functions are continuous functions, then the discrete function values of the selected waveform functions are obtained by sampling values of the continuous functions, wherein the interval of the sampling is equal to the time interval between adjacent discrete data in the time domain data sequence for each symbol. That is to say, the discrete function values of the waveform functions refer to function values corresponding to the variable values at the same time positions as the time domain data of each symbol. For example, the data sequence of each symbol is repeatedly expanded to obtain a data sequence of a length $N \times T$. Assuming that the time interval between adjacent discrete data is Ts, and K discrete data is included in time T, then there is $K \times Ts = T$, $N \times K \times Ts = N \times T$. Therefore, $N \times K$ discrete data is included in the data sequence of a length $N \times T$ (here, $N \times K$ is an integer). Assuming that the first discrete data is at a time of 0, the second discrete data is at a time of Ts, the third is at 2 Ts, and the $N \times K$-th (that is, the last) discrete data is at $(N \times K - 1)Ts$. As described above, the interval length of the variables of the waveform functions is also $N \times T$, and thus, the discrete function values of the waveform functions refer to corresponding values of the functions when values of the independent variable are 0, Ts, ..., $(N \times K - 1)Ts$.

If the selected waveform functions are discrete functions, then the number of the discrete function values of the selected waveform functions is the same as that of discrete data in the time domain data sequence which has a length of $N \times T$ for each symbol. The discrete function may be obtained by sampling the continuous functions.

The range of values for the abovementioned T may be prescribed by a standard/protocol, or configured by a corresponding node (for example, the specific values may be configured by the node when multiple values are prescribed). For example, when the transmitting node is a UE, the values of the first parameter may be configured and transmitted to the UE by the base station. Before data sequences of L consecutive symbols are modulated, the length of the data sequence of each symbol may be equal to T, less than T or greater than T, which is not limited by embodiments of the present disclosure. If the length of the data sequence of each symbol before modulation is not equal to T, then the operation described above of expanding the data sequence repeatedly for each symbol may include a process of expanding in a period of the data sequence for each symbol before modulation repeatedly, and truncating or adding a cyclic prefix and suffix to the data sequence expanded repeatedly so that the data sequence for each symbol may have a length of N×T.

The L consecutive symbols may be symbols on one sub-frame or one resource block in the multi-carrier system, and may also be a plurality of symbols included in other resource units.

Other processing procedures may be added between the abovementioned IFFT process and the polyphase filtering modulation. This is not specifically limited in the present disclosure.

After the data of L consecutive symbols is modulated by the transmitting node using the specified waveform functions, DAC (digital to analog converter) operation and subsequent RF operation may be performed on the data, which then may be transmitted through the antenna.

Figure 2:
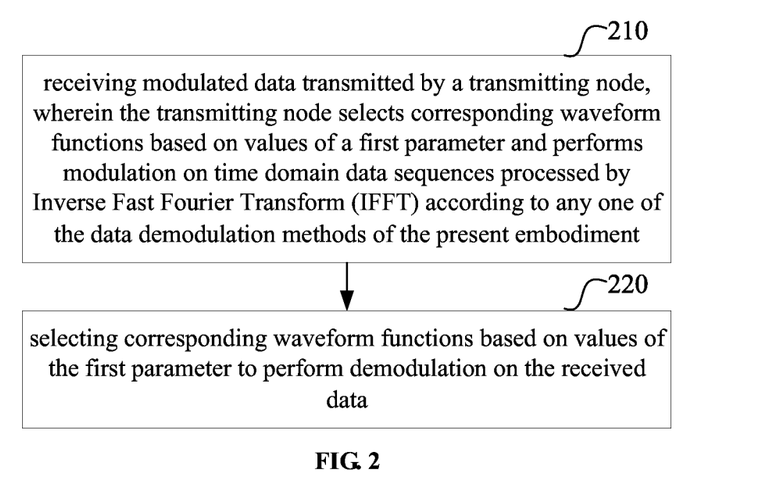
FIG. 2 is a flowchart of a data demodulating method according to Embodiment 1 of the present disclosure.

A data demodulating method for a multi-carrier system is also provided in the present embodiment, the method is applied to a receiving node, as shown in FIG. 2, and includes the following steps.

At step 210, modulated data transmitted by a transmitting node is received, wherein the transmitting node selects corresponding waveform functions based on values of a first parameter and performs modulation on time domain data sequences processed by Inverse Fast Fourier Transform (IFFT) according to any one of the data demodulation methods of the present embodiment.

At step 220, corresponding waveform functions are selected based on values of the first parameter to perform demodulation on the received data.

After the received data is demodulated, the method may further include: performing channel equalization and detection on the demodulated data to recover the data before modulation.

Figure 3:
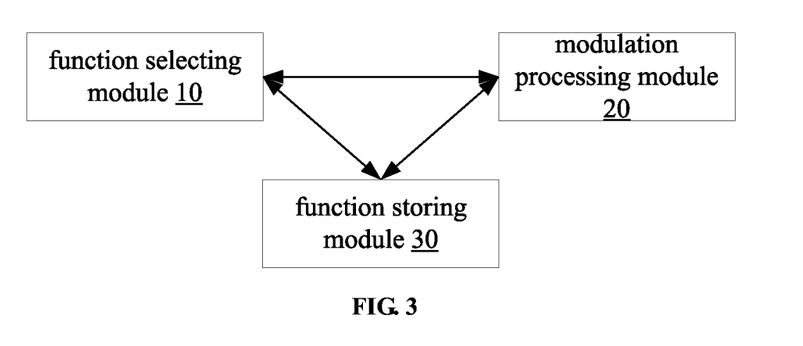
FIG. 3 is a block diagram of a transmitting node according to Embodiment 1 of the present disclosure.

A transmitting node of a multi-carrier system is also provided in the present embodiment, the transmitting node includes a data modulating device. As shown in FIG. 3, the data modulating device includes a function selecting module 10, a modulation processing module 20, and a function storing module 30.

The function selecting module 10 is configured to select corresponding waveform functions based on values of a first parameter, wherein the first parameter includes K values corresponding to K different waveform functions, respectively, and K is an integer greater than 1.

The modulation processing module 20 is configured to perform, using the selected waveform functions, modulation on time domain data sequences processed by Inverse Fast Fourier Transform (IFFT) to obtain a modulated data sequence.

The function storing module 30 is configured to store K different waveform functions corresponding to the K values, respectively.

The K waveform functions stored in the function storing module 30 include one or more of the following functions: a rectangular function; a raised cosine function; a piecewise function; and a root raised cosine function.

An interval length of independent variables of the K waveform functions stored in the function storing module 30 is $N_k \times T$, wherein $N_k$ is a real number greater than or equal to 1, k=1, 2, . . . , K, and the modulated data sequence includes data sequences for multiple symbols, wherein T is a predetermined interval between symbols of the modulated data sequence.

A maximum time span between the independent variables corresponding to non-zero values of the K waveform functions stored in the function storing module 30 is greater than or equal to T.

The modulation performed by the modulation processing module 20 is filter modulation or filter bank (FB) modulation.

The modulation processing module 20 being configured to perform, using the selected waveform functions, FB modulation on time domain data sequences processed by IFFT including: the modulation processing module being configured to window, using the selected waveform functions, time domain data sequences processed by IFFT.

The modulation processing module 20 being configured to perform, using the selected waveform functions, FB modulation on time domain data sequences which have been processed by IFFT to obtain a modulated data sequence including: the modulation processing module being configured to perform, by the modulation processing module 20, using discrete function values of the selected waveform functions, waveform modulation on a time domain data sequence for each symbol in L consecutive symbols processed by IFFT, and superimpose L waveform modulated data sequences to obtain a modulated data sequence of the L consecutive symbols, wherein L≥2.

The modulation processing module 20 includes an expanding unit, a dot multiplying unit, and a superimposing unit.

The expanding unit is configured to expand the time domain data sequence repeatedly for each symbol to obtain a time domain data sequence which has a length of N×T for each symbol, wherein N×T is an interval length of independent variables of the selected waveform functions.

The dot multiplying unit is configured to perform dot multiplication between the discrete function values of the selected waveform functions and the time domain data sequence for each symbol which has a length of N×T to obtain L waveform modulated data sequences each having a length of N×T.

The superimposing unit is configured to shift each of the waveform modulated data sequences having a length of N×T by T in the time domain sequentially, and superimpose the shifted data sequences to obtain the modulated data sequence for the L consecutive symbols.

The waveform functions selected by the function selecting module 10 are continuous functions and the discrete function values of the selected waveform functions are obtained by sampling values of the continuous functions, wherein the interval of the sampling is equal to the time interval between adjacent discrete data in the time domain data sequence for each symbol; or the waveform functions selected by the function selecting module 10 are discrete functions, and the number of the discrete function values of the selected waveform functions is the same as that of discrete data in the time domain data sequence which has a length of N×T for each symbol.

The L consecutive symbols modulated by the modulation processing module 20 are symbols on one sub-frame or one resource block in the multi-carrier system.

The receiving end includes various receiving devices such as a base station, a terminal, a relay, and the like. The receiving devices are collectively referred to as a receiving node herein. The receiving node receives the modulated data and performs demodulation using the same pre-specified waveform functions as the transmitting node, and then recovers the data before modulation through subsequent channel equalization and detection.

Figure 4:
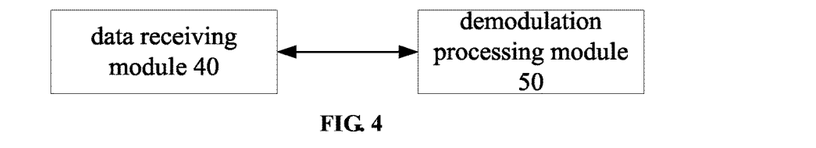
FIG. 4 is a block diagram of a receiving node according to Embodiment 1 of the present disclosure.

A receiving node of a multi-carrier system is provided in the present embodiment, the receiving node includes a data demodulating device. As shown in FIG. 4, the data demodulating device includes a data receiving module 40 and a demodulation processing module 50.

The data receiving module 40 is configured to receive modulated data transmitted by a transmitting node, wherein the transmitting node selects corresponding waveform functions based on values of a first parameter and performs modulation on time domain data sequences processed by Inverse Fast Fourier Transform (IFFT) according to any one of the data demodulation methods of the present embodiment; and The demodulation processing module 50 is configured to select corresponding waveform functions based on values of the first parameter to perform demodulation on the received data.

In the present embodiment, the receiving node further includes a channel equalizing and detecting module configured to perform channel equalization and detection on the demodulated data to recover the data before modulation.

Embodiment 2

Figure 5:
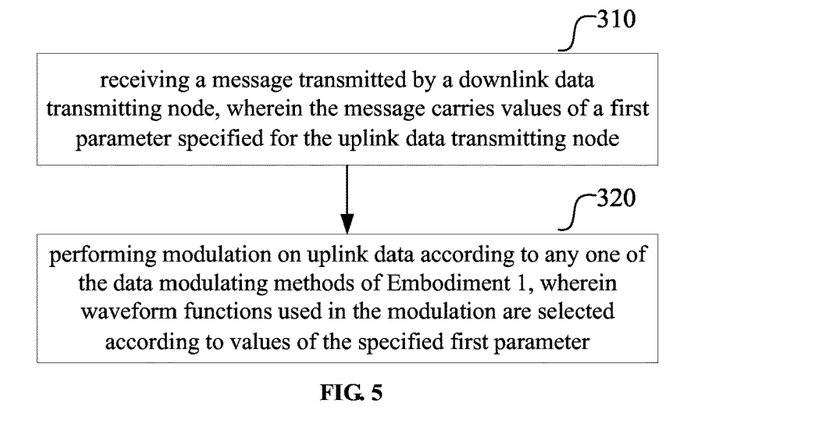
FIG. 5 is a flowchart of a data modulating method according to Embodiment 2 of the present disclosure.

A data modulating method for a multi-carrier system is provided in the present embodiment, the method is applied to an uplink data transmitting node. As shown in FIG. 5, the method includes the following steps.

At step 310, a message transmitted by a downlink data transmitting node is received, wherein the message carries values of a first parameter specified for the uplink data transmitting node.

The downlink data transmitting node may also be referred to as a uplink data receiving node.

At step 320, modulation is performed on uplink data according to any one of the data modulating methods of Embodiment 1, wherein waveform functions used in the modulation are selected according to values of the specified first parameter.

Figure 6:
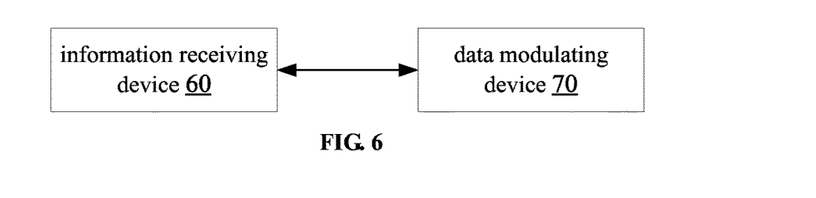
FIG. 6 is a block diagram of an uplink data transmitting node according to Embodiment 2 of the present disclosure.

An uplink data transmitting node of a multi-carrier system is also provided in the present embodiment. As shown in FIG. 6, the uplink data transmitting node includes an information receiving device 60 and a data modulating device 70.

The information receiving device 60 is configured to receive a message transmitted by a downlink data transmitting node, wherein the message carries values of a first parameter specified for the uplink data transmitting node.

The data modulating device 70 is configured to perform modulation on uplink data according to any one of the data modulating methods of Embodiment 1, wherein waveform functions used in the modulation are selected according to values of the specified first parameter.

The data modulating device 70 may be any one of the data modulating devices of Embodiment 1.

Figure 7:
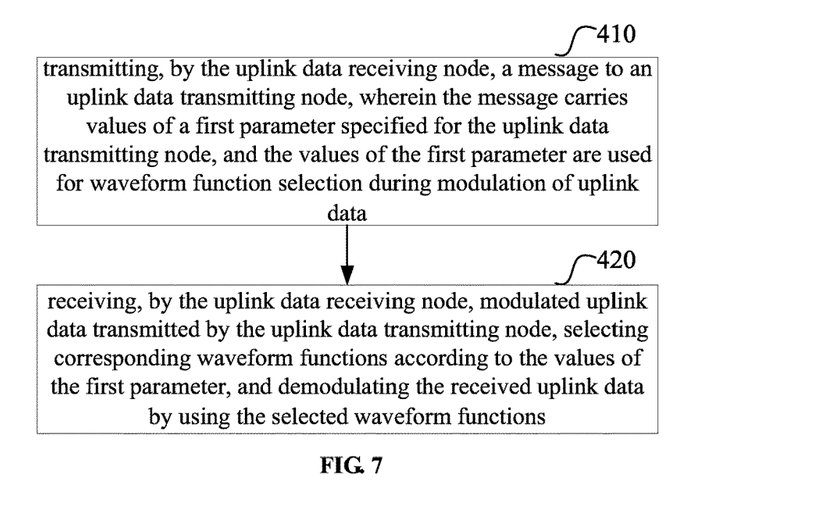
FIG. 7 is a flowchart of a data demodulating method according to Embodiment 2 of the present disclosure.

A data demodulating method for a multi-carrier system is also provided in the present embodiment, the method is applied to an uplink data receiving node, as shown in FIG. 7, the method includes the following steps.

At step 410, the uplink data receiving node transmits a message to an uplink data transmitting node, wherein the message carries values of a first parameter specified for the uplink data transmitting node, and the values of the first parameter are used for waveform function selection during modulation of uplink data.

At step 420, the uplink data receiving node receives modulated uplink data transmitted by the uplink data transmitting node, selects corresponding waveform functions according to the values of the first parameter, and demodulates the received uplink data by using the selected waveform functions.

The first parameter includes K values corresponding to K different waveform functions, respectively, and K is an integer greater than 1.

The above mentioned uplink data transmitting node performs modulation on uplink data according to any one of the data modulating methods of the present embodiment.

Figure 8:
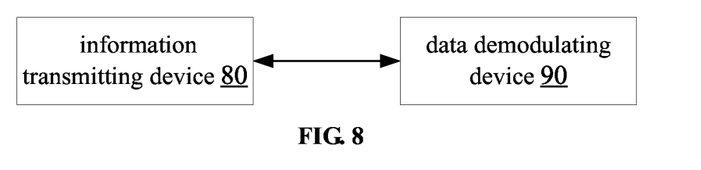
FIG. 8 is a block diagram of an uplink data receiving node according to Embodiment 2 of the present disclosure.

An uplink data receiving node of a multi-carrier system is also provided in the present embodiment. As shown in FIG. 8, the uplink data receiving node includes an information transmitting device 80 and a data demodulating device 90.

The information transmitting device 80 is configured to transmit a message to an uplink data transmitting node, wherein the message carries values of a first parameter specified for the uplink data transmitting node, and the values of the first parameter are used for waveform function selection during modulation of uplink data.

The data demodulating device 90 is configured to receive modulated uplink data transmitted by the uplink data transmitting node, select corresponding waveform functions according to the values of the first parameter, and demodulate the received uplink data by using the selected waveform functions.

The first parameter includes K values corresponding to K different waveform functions, respectively, and K is an integer greater than 1.

The data demodulating device 90 may be any one of the data demodulating devices of Embodiment 1.

Embodiment 3

Figure 9:
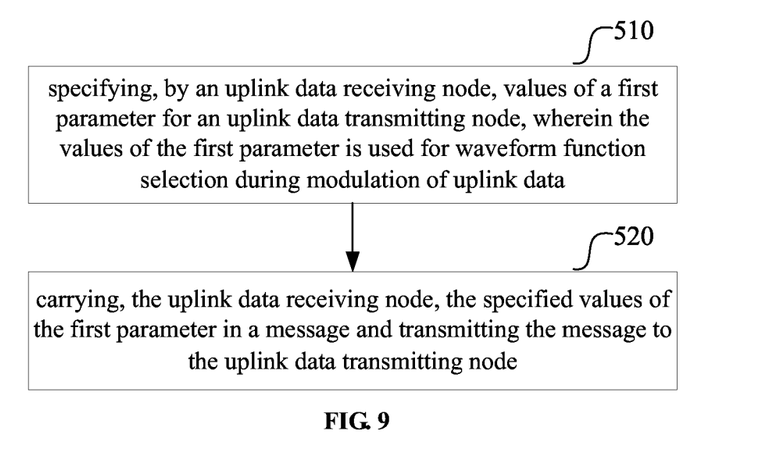
FIG. 9 is a flowchart of a data transmission method according to Embodiment 3 of the present disclosure.

A data transmission method for a multi-carrier system is provided in the present embodiment, as shown in FIG. 9, the method includes the following steps.

At step 510, an uplink data receiving node specifies values of a first parameter for an uplink data transmitting node, wherein the values of the first parameter is used for waveform function selection during modulation of uplink data.

In the present embodiment, the K different waveform functions include one or more of the following functions with different parameters: a rectangular function; a raised cosine function; a piecewise function; and a root raised cosine function.

An interval length of independent variables of the K waveform functions is $N_k \times T$, wherein $N_k$ is a real number greater than or equal to 1, k=1, 2, . . . , K, and the modulated data sequence includes data sequences for multiple symbols, wherein T is a predetermined interval between symbols of the modulated data sequence.

At step 520, the uplink data receiving node carries the specified values of the first parameter in a message and transmitting to the uplink data transmitting node.

At this step, the first parameter includes K values corresponding to K different waveform functions, respectively, and K is an integer greater than 1.

The present embodiment further includes: performing modulation for downlink data, by the uplink data receiving node, using one of the waveform functions on time domain data sequences processed by Inverse Fast Fourier transform (IFFT).

Figure 10:
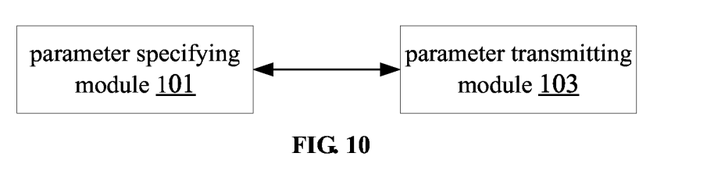
FIG. 10 is a block diagram of an uplink data receiving node according to Embodiment 3 of the present disclosure.

An uplink data receiving node of a multi-carrier system is also provided in the present embodiment, the uplink data receiving node includes a data transmitting device. As shown in FIG. 10, the data transmitting device includes a parameter specifying module 101 and a parameter transmitting module 103.

The parameter specifying module 101 is configured to specify values of a first parameter for an uplink data transmitting node, wherein the values of the first parameter is used for waveform function selection during modulation of uplink data.

The parameter transmitting module 103 is configured to carry the specified values of the first parameter in a message and transmitting to the uplink data transmitting node.

The first parameter includes K values corresponding to K different waveform functions, respectively, and K is an integer greater than 1.

In the present embodiment, the uplink data receiving node further includes: a data modulating device configured to perform modulation, using one of the waveform functions, on time domain data sequences processed by Inverse Fast Fourier transform (IFFT).

The data modulating device may be any one of the data modulating devices of Embodiment 1.

In the above embodiment, according to different configurations of the parameter values of the waveform functions, data may be modulated by appropriate waveform functions flexibly selected so as to meet requirements of different scenarios. For example, the root raised cosine function may be selected in scenarios where suppression for the out-of-band leakage is very demanding, and the rectangular waveform function may be selected in a scenario where multi-path delay has large influence. Since IFFT is performed first, and waveform function modulation is performed afterwards, good compatibility with LTE may be realized. Although the data of adjacent symbols, which has been modulated by waveform functions having a length of N×T, may be superimposed to and interfered by each other, no interference may occur between symbols when appropriate waveform functions are selected. For example, if the root-raised cosine function is selected, the symbols may be possibly enabled being orthogonal with each other, such that better demodulation performance may be achieved at the receiving end.

In addition, the main lobe width of the subcarrier in the frequency domain may be narrowed by flexibly selecting appropriate waveform functions in the above embodiments. Thus overlapping and interference between adjacent lobes will not occur. In this scenario, adjacent subcarriers may not synchronize with each other. That is to say, the minimum unit of user resource scheduling may be in units of subcarriers, and synchronization between users is not required.

A person skilled in the art should understand that the technical solutions of the embodiments of the present disclosure may be modified or equivalently substituted without departing from the spirit and scope of the technical solutions of the present application. These modifications and equivalent substitutions should be included in the scope of the claims of the present application.

Those of ordinary skills in the art may understand that the functional modules/units in all or some of the steps, systems, and devices of the methods disclosed above may be implemented as software, firmware, hardware, and suitable combinations thereof. When implemented as hardware, the division between the functional modules/units mentioned in the above description does not necessarily correspond to the division of physical units. For example, a physical component may have multiple functions, or a function or step may be performed cooperatively by several physical components. Some or all of the components may be implemented as software executed by a processor, such as a digital signal processor or microprocessor, or implemented as hardware, or as an integrated circuit, such as an application-specific integrated circuit. Such software may be distributed on computer readable medium including computer storage medium (or non-transitory medium) and communication medium (or transitory medium). As is well known to those of ordinary skills in the art, the term computer storage medium includes volatile and non-volatile medium as well as removable and un-removable medium implemented in any method or technology for storing information such as computer readable instructions, data structures, program modules or other data. Computer storage medium includes, but are not limited to, RAM, ROM, EEPROM, flash memory or other memory technology, CD-ROM, digital versatile disc (DVD) or other optical disk storage, magnetic cassette, magnetic tape, magnetic disk storage, or other magnetic storage devices, or any other medium that is used to store the desired information and can be accessed by the computer. Furthermore, it is well known to those of ordinary skills in the art that communication medium typically embodies computer readable instructions, data structures, program modules, or other data in a modulated data signal such as a carrier wave or other transmission mechanism and may include any information delivery media.

What is claimed is:

1. A data modulating method for a multi-carrier system, applied to a transmitting node, comprising:
   selecting corresponding waveform functions based on values of a first parameter, wherein the first parameter includes K values corresponding to K different waveform functions, respectively, and K is an integer greater than 1; and
   performing, using the selected waveform functions, modulation on time domain data sequences processed by Inverse Fast Fourier Transform (IFFT) to obtain a modulated data sequence.

2. The method of claim 1, wherein
the K different waveform functions includes one or more of the following functions with different parameters:
a rectangular function;
a raised cosine function;
a piecewise function; and
a root raised cosine function.

3. The method of claim 1, wherein
an interval length of independent variables of the K different waveform functions is Nk×T, wherein Nk is a real number greater than or equal to 1, k=1, 2, . . . , K, and the modulated data sequence includes data sequences for multiple symbols, wherein T is a predetermined interval between symbols of the modulated data sequence.

4. The method of claim 3, wherein
a maximum time span between the independent variables corresponding to non-zero values of the K different waveform functions is greater than or equal to T.

5. The method of claim 1, wherein
the modulation is filter modulation or filter bank (FB) modulation.

6. The method of claim 5, wherein
performing, using the selected waveform functions, FB modulation on time domain data sequences processed by IFFT comprising:
windowing, using the selected waveform functions, the time domain data sequences processed by IFFT.

7. The method of claim 6, wherein
performing, using the selected waveform functions, FB modulation on the time domain data sequences processed by IFFT to obtain the modulated data sequence comprising:
performing, using discrete function values of the selected waveform functions, waveform modulation on a time domain data sequence for each symbol in L consecutive symbols processed by IFFT, and superimposing L waveform modulated data sequences to obtain a modulated data sequence for the L consecutive symbols, wherein L≥2.

8. The method of claim 7, wherein
performing, using discrete function values of the selected waveform functions, waveform modulation on a time domain data sequence for each symbol in L consecutive symbols processed by IFFT comprising:
expanding the time domain data sequence repeatedly for each symbol to obtain a time domain data sequence which has a length of N×T for each symbol, wherein N×T is an interval length of independent variables of the selected waveform functions;
performing dot multiplication between the discrete function values of the selected waveform functions and the time domain data sequence which has a length of N×T for each symbol to obtain L waveform modulated data sequences each having a length of N×T;
superimposing the L waveform modulated data sequences to obtain a modulated data sequence for the L consecutive symbols comprising:
shifting each of the waveform modulated data sequences having a length of N×T by T in the time domain sequentially, and superimposing the shifted data sequences to obtain the modulated data sequence for the L consecutive symbols.

9. The method of claim 7, wherein
the selected waveform functions are continuous functions and the discrete function values of the selected waveform functions are obtained by sampling values of the continuous functions, wherein the interval of the sampling is equal to the time interval between adjacent discrete data in the time domain data sequence for each symbol; or
the selected waveform functions are discrete functions, and the number of the discrete function values of the selected waveform functions is the same as that of discrete data in the time domain data sequence which has a length of N×T for each symbol.

10. The method of claim 7, wherein
the L consecutive symbols are symbols on one sub-frame or one resource block in the multi-carrier system.

11. A data demodulating method for a multi-carrier system, applied to a receiving node, comprising:
receiving modulated data transmitted by a transmitting node, wherein the transmitting node selects corresponding waveform functions based on values of a first parameter and performs modulation on time domain data sequences processed by Inverse Fast Fourier Transform (IFFT) according to the data demodulation method of claim 1; and
selecting corresponding waveform functions based on values of the first parameter to perform demodulation on the received data.

12. The method of claim 11, after the received data is demodulated, the method further comprising:
performing channel equalization and detection on the demodulated data to recover the data before modulation.

13. A data modulating method for a multi-carrier system, applied to an uplink data transmitting node, comprising:
receiving a message transmitted by a downlink data transmitting node, wherein the message carries values of a first parameter specified for the uplink data transmitting node; and
performing modulation on uplink data according to the data modulating method of claim 1, wherein waveform functions used in the modulation are selected according to values of the specified first parameter.

14. A data demodulating method for a multi-carrier system, applied to an uplink data receiving node, comprising:
transmitting, by the uplink data receiving node, a message to an uplink data transmitting node, wherein the message carries values of a first parameter specified for the uplink data transmitting node, and the values of the first parameter are used for waveform function selection during modulation of uplink data; and
receiving, by the uplink data receiving node, modulated uplink data transmitted by the uplink data transmitting node, selecting corresponding waveform functions according to the values of the first parameter, and demodulating the received uplink data by using the selected waveform functions;
wherein the first parameter includes K values corresponding to K different waveform functions, respectively, and K is an integer greater than 1.

15. A data transmission method for a multi-carrier system, comprising:
specifying, by an uplink data receiving node, values of a first parameter for an uplink data transmitting node, wherein the values of the first parameter is used for waveform function selection during modulation of uplink data; and
carrying, by the uplink data receiving node, the specified values of the first parameter in a message and transmitting to the uplink data transmitting node;
wherein the first parameter includes K values corresponding to K different waveform functions, respectively, and K is an integer greater than 1.

16. A non-transitory computer readable storage medium storing computer executable instructions for performing the method of claim 1.

17. A non-transitory computer readable storage medium storing computer executable instructions for performing the method of claim 11.

18. A non-transitory computer readable storage medium storing computer executable instructions for performing the method of claim 13.

19. A non-transitory computer readable storage medium storing computer executable instructions for performing the method of claim 14.

20. A non-transitory computer readable storage medium storing computer executable instructions for performing the method of claim 15.

* * * * *